Feb. 2, 1926.
W. WILKINSON
INDICATOR
Filed Feb. 14, 1925
1,571,657
Fig. 1,
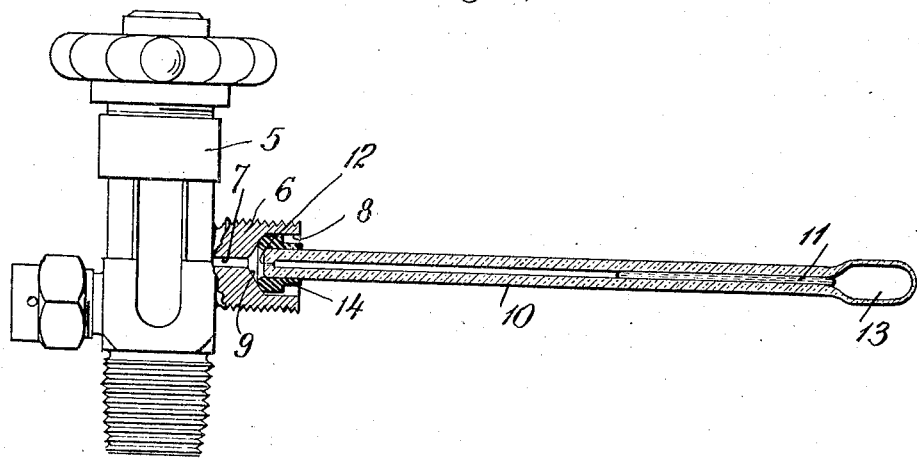
Fig. 2,
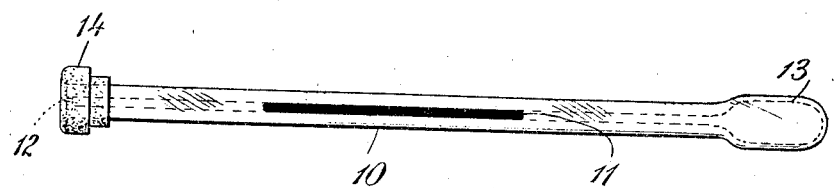
INVENTOR
Walter Wilkinson
BY
his ATTORNEYS Patented Feb. 2, 1926.

1,571,657

UNITED STATES PATENT OFFICE.

WALTER WILKINSON, OF JERSEY CITY, NEW JERSEY, ASSIGNOR TO AIR REDUCTION COMPANY, INCORPORATED, OF NEW YORK, N. Y., A CORPORATION OF NEW YORK.

INDICATOR.

Application filed February 14, 1925. Serial No. 9,150.

*To all whom it may concern:*

Be it known that I, WALTER WILKINSON, a citizen of the United States, residing at Jersey City, in the county of Hudson, State of New Jersey, have invented certain new and useful Improvements in Indicators; and I do hereby declare the following to be a full, clear, and exact description of the invention, such as will enable others skilled in the art to which it appertains to make and use the same.

This invention relates to an indicator which is adapted particularly for use in detecting slight leakages of gases from containers. The device can be used advantageously in determining whether the valves such as are used in maintaining gases under pressure are subject to leakage, but its use is not so limited as will be understood readily from the following description.

Gases such as oxygen and nitrogen are transported commercially in steel cylinders under pressures of upward to two thousand pounds. These cylinders are provided with outlet valves so that the gas can be withdrawn as desired, and because of the pressure maintained it is, of course, necessary that the valves be absolutely tight. The frequent opening and closing of such a valve sometimes results in injury to the valve seat so that leakage of almost imperceptible amounts of gas occurs. Even the slightest opening will result, however, in a very considerable loss of the gas while the cylinder is in storage and during transportation thereof. The valves must be inspected, therefore, to ensure absolute tightness.

It is the object of the present invention to provide a simple and reliable instrument whereby the slightest leakage can be readily detected without the necessity of applying any foreign matter to the valve outlet.

Other objects and advantages of the invention will be apparent as it is better understood by reference to the following specification and accompanying drawing, in which—

Fig. 1 is an elevation of a valve such as is used with gas cylinders, the outlet being shown in section with the instrument applied thereto for the purpose of detecting the escape of gas; and Fig. 2 is an enlarged longitudinal section of the device.

The invention depends upon the effect of increased pressure resulting from the escape of gas in a capillary tube in which a liquid is held and is adapted to move under the influence of pressure. The device may consist, therefore, of a capillary tube of glass or other suitable material in which a small amount of liquid is held with a flexible base so that the end of the tube can be applied to the gas outlet of the valve to maintain a substantially tight connection. The capillary tube is preferably provided with an expansion chamber at the opposite end and may be partially filled with any suitable liquid, mercury being preferred although water colored with a dye so as to make it more readily visible can be substituted. The mercury has the advantage that it does not wet the walls of the capillary passage and the liquid is less likely to become separated into beads. Such separation does not, however, materially reduce the efficiency of the device as movement of the liquid will occur whenever a slight pressure is applied in the portion of the capillary passage below the liquid.

Referring to the drawing, 5 indicates a valve body which may be of any suitable construction, the form of the valve shown being that which is used customarily in outlet valves for tanks used for the transportation of oxygen and nitrogen under pressure. The valve is provided with an outlet nipple 6 having a passage 7 which is enlarged at 8 and provided with a conical shoulder 9 surrounding the outlet 7.

The indicator comprises a tube 10 preferably of glass and having a capillary passage 11 therein which is open at the end 12 and is enlarged at the opposite end to form a chamber 13. A resilient cap 14 surrounds the open end 12 of the tube 10. The cap is preferably made of rubber and may consist merely of a short strip of rubber tubing surrounding the end of the tube and turned back upon itself so that the end of the capillary tube remains open.

The capillary passage 11 is filled readily with a suitable liquid by dipping the open end of the tube in the liquid and heating the tube slightly to drive out a small amount of air which expands under the influence of the heat. When the tube is permitted to cool a small amount of the liquid will be drawn into the capillary passage and will remain there preferably at a point about midway of the length thereof. This liquid, as previously noted, may be mercury or water suitably colored, or in fact any solution which is readily visible.

In using the device the resilient cap is pressed against the shoulder 9 surrounding the passage 7. If the slightest amount of gas is escaping through its passage it will create immediately a slight pressure in the capillary passage below the liquid and the latter will be forced upwardly in the passage and possibly into the expansion chamber 13. This is a sufficient indication that the valve is unsuitable for use in the cylinder and that it should be removed and repaired before the cylinder is used for the transportation of gas under pressure.

Obviously the shape of the tube and of the resilient cap are not essential to the accomplishment of the desired purpose, and in fact it is not necessary that the cap be resilient if the surface which it engages is reasonably smooth so that a substantially gas-tight joint can be effected. These and other changes in the details of the structure can be made without affecting its function or sacrificing any of the advantages thereof.

I claim:—

1. An indicator comprising a tube having a capillary passage open at one end and containing a liquid index and a cap at the open end of the tube adapted to form a substantially gas-tight joint with a surface surrounding a gas outlet.

2. An indicator comprising a tube having a capillary passage open at one end and containing a liquid index and a resilient cap at the open end of the tube adapted to form a substantially gas-tight joint with a surface surrounding a gas outlet.

3. An indicator comprising a tube having a capillary passage open at one end, enlarged at the other end to form an expansion chamber, and containing a liquid index and a cap at the open end of the tube adapted to form a substantially gas-tight joint with a surface surrounding a gas outlet.

In testimony whereof I affix my signature.

WALTER WILKINSON.